UNITED STATES PATENT OFFICE.

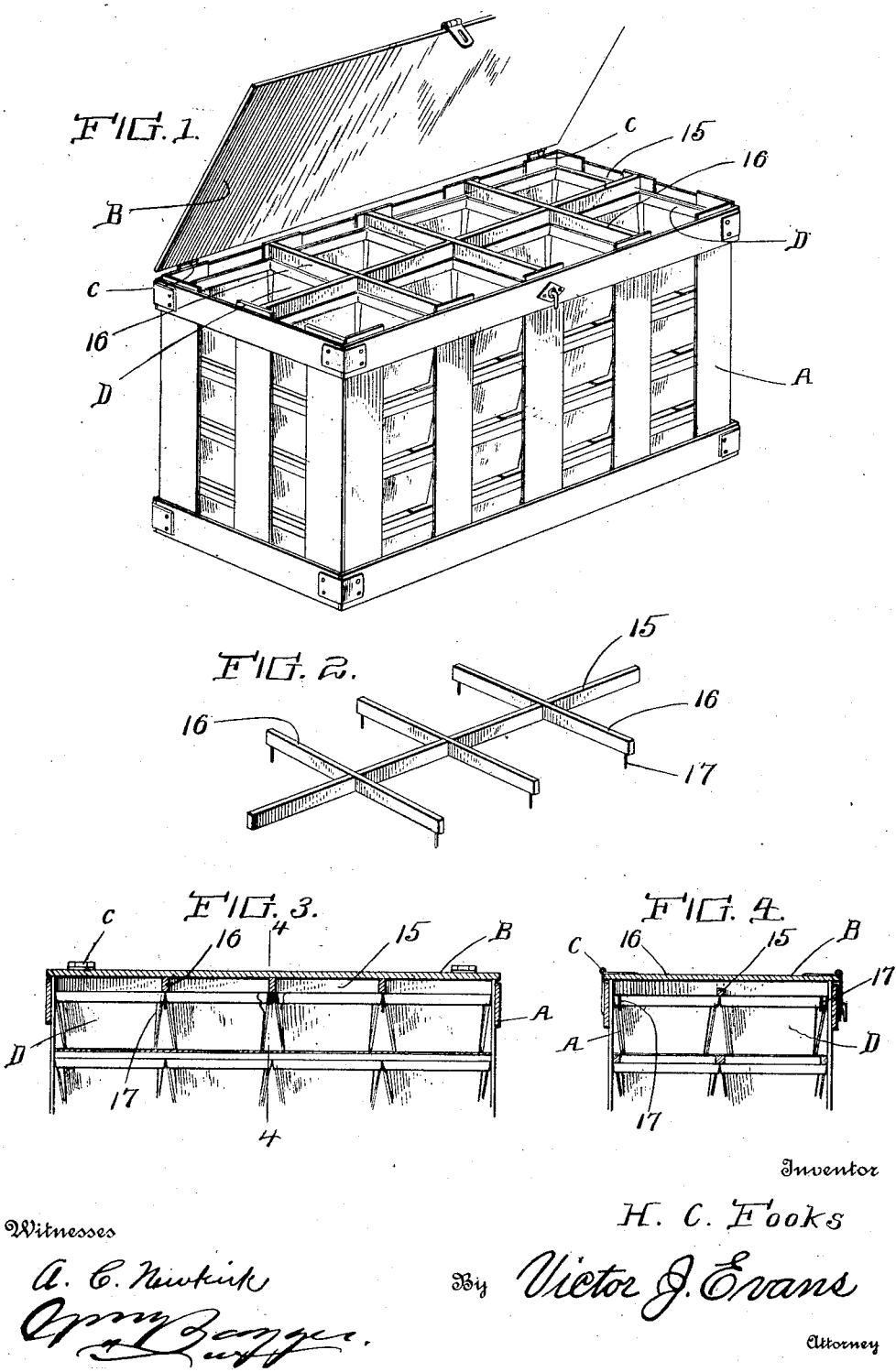

HARRY C. FOOKS, OF SALISBURY, MARYLAND.

FRUIT-PROTECTING DEVICE FOR BERRY-CRATES.

1,226,875. Specification of Letters Patent. Patented May 22, 1917.

Application filed April 29, 1916. Serial No. 94,380.

*To all whom it may concern:*

Be it known that I, HARRY C. FOOKS, a citizen of the United States, residing at Salisbury, in the county of Wicomico and State of Maryland, have invented new and useful Improvements in Fruit-Protecting Devices for Berry-Crates, of which the following is a specification.

This invention relates to an improved fruit protecting device for berry crates.

Fruits such as strawberries and the like are now almost universally transported in boxes or crates containing thirty-two one quart receptacles which are arranged in four layers each containing eight receptacles. The several layers are separated by partitions to avoid the crushing of the fruit in the lower layers. For the protection of the top layer the lid, which is hingedly connected with the body of the crate, is usually provided on its under face with cleats disposed transversely and extending across the interspaces between the receptacles, so that the latter will be held down and be prevented from jolting. This arrangement, however, has proven very defective so far as protection of the top layer of fruit is concerned, and for this several reasons may be assigned. For one thing, the cleats, in order to engage the top edges of the receptacles, are usually made of excessive width, so that in closing the lid several berries in each receptacle will become crushed and destroyed. Again, while the transversely arranged cleats would furnish partitions between the receptacles adjacent to the sides thereof, there would be no partition between the front and rear receptacles, thus permitting the berries to roll between the receptacles, becoming disarranged and bruised, so as to present an unattractive appearance upon reaching the destination. It is well known that the condition of the berries is frequently judged by the top layer of fruit and that if this is not entirely fresh and attractive a depreciation in value is sure to result irrespective of the condition of the subjacent layers.

The present invention has for its object to produce a very simple, convenient and inexpensive frame structure which may be placed in the top of the ordinary commercial crate and which will be adapted to engage the top edges of the individual receptacles only, the frame being so proportioned that the placing thereof in the crate cannot result in the crushing of berries; said frame being adapted to be held down by the lid, when closed, and said frame affording a complete partition between the top layers of berries in individual receptacles, preventing the berries from rolling from one receptacle to another and from becoming otherwise displaced and consequently preventing the bruising and depreciation of the fruit.

In the accompanying drawing has been illustrated a simple and preferred form of the invention, it being, however, understood that no limitation is necessarily made to the precise structural details therein exhibited, but that changes, alterations and modifications within the scope of the appended claims may be resorted to when desired.

In the drawing,—

Figure 1 is a perspective view showing a crate to which the invention has been applied, the lid being open.

Fig. 2 is a perspective view of the improved protective frame, detached.

Fig. 3 is a longitudinal sectional view through the top portion of the crate with the invention applied and with the lid closed.

Fig. 4 is a transverse sectional view taken on the line 4—4 in Fig. 3.

Corresponding parts in the several figures are denoted by like characters of reference.

The frame which constitutes the improved device is composed of a centrally disposed longitudinal bar 15 with which at intervals cross pieces are connected to form laterally extending arms 16. The bar 15 and the cross pieces forming the arms 16 are preferably provided with interengaging mortises enabling them to be connected so that the bar and the arms will all lie in the same plane, but the manner of constructing and assembling the parts is not regarded of material importance in this connection, it being understood that any suitable joints of well-known construction may be employed. A conventional berry crate is shown at A, B being the lid of the same which is connected with the body of the crate by hinges C. Individual berry baskets or receptacles are shown at D.

The longitudinal bar of the protective frame is of a length equal to the length of the crate, interior measurement, and the cross pieces constituting the arms 16 are each of a length equal to the width of the crate, interior measurement. The bar 15 being centrally disposed will be adapted to rest on the top edges of the receptacles in the top layer in the crate, lengthwise thereof, and the arms 16 will be equidistantly spaced and adapted to engage the top edges of the receptacles D in the front and rear rows. The bar 15 and arms 16 are made of such width that they will barely engage the top edges of the receptacles D without overlapping the same, and the frame may thus be placed in position in the top of the crate without possibility of crushing any of the fruit. When the lid B is closed down it will engage the top edges of the bar 15 and arms 16, exerting downward pressure thereon and on the top edges of the receptacles D which will thus be held very securely. The bar 15 and arms 16 will afford partitions between all of the receptacles D in the top layer, preventing possibility of berries rolling from one receptacle to another or from being otherwise displaced, crushed and mutilated.

It is preferred to provide the arms 16 adjacent to the ends thereof with downwardly extending pins or projections, indicated at 17, and constituting guides adapted to enter the spaces between the corners of the fruit containers. It sometimes happens that the joints between the bar 15 and the cross pieces which form the arms 16 become loosened, thus permitting the cross pieces to swing so as to present the arms at other than right angles with respect to the center bar 15. When this is the case the guides 17 become serviceable in entering between the fruit containers, thus enabling the person placing the frame in the crate to dispose it exactly in the right position, said projections or guide members serving also to prevent possibility of the arms or cross pieces becoming dislodged or displaced while in transit. The guide members or projections 17 may consist of wire pins or nails inserted into the ends of the arms 16, or they may be constructed or applied in any convenient manner.

The improved protective frame may be produced at a very trifling expense which will be much more than compensated for by the prices obtainable for fruit reaching its destination in first class condition.

Having thus described the invention, what is claimed as new, is:—

1. A fruit crate having a hinged lid, and berry receptacles stacked in said crate, in combination with a fruit protective frame comprising a bar of a length equal to the length of the crate, interior measurement, said bar having cross pieces connected therewith, equidistantly spaced and of a length equal to the width of the crate, interior measurement, said frame being disposed above the top layer of fruit containers with the lower faces of the bar and cross pieces in engagement with the top edges of the containers, the top edges of the bar and cross pieces being directly engaged by the lid when the latter is closed.

2. A fruit crate having a hinged lid, and berry receptacles stacked in said crate, in combination with a fruit protective frame comprising a bar of a length equal to the length of the crate, interior measurement, said bar having cross pieces connected therewith, equidistantly spaced and of a length equal to the width of the crate, interior measurement, said frame being disposed above the top layer of fruit containers with the lower faces of the bar and cross pieces in engagement with the top edges of the containers, the top edges of the bar and cross pieces being directly engaged by the lid when the latter is closed; the cross pieces being provided adjacent to the ends thereof with downwardly extending pins constituting guides adapted to enter the spaces between the fruit containers.

3. A frame constituting a fruit protector for berry crates, said frame comprising a longitudinally disposed center bar and a plurality of cross pieces connected therewith and forming laterally extending arms, said arms being provided adjacent to the ends thereof with downwardly extending pins constituting guide members.

In testimony whereof I affix my signature.

HARRY C. FOOKS.